United States Patent [19]

Adachi et al.

[11] Patent Number: 5,150,302

[45] Date of Patent: Sep. 22, 1992

[54] DECENTRALIZED CONTROL METHOD FOR CORRUGATOR LINE

[75] Inventors: Nokihisa Adachi; Minoru Naito; Shinji Watanabe, all of Kasugai, Japan

[73] Assignee: Isowa Industry Company Ltd., Aichi, Japan

[21] Appl. No.: 530,514

[22] Filed: May 30, 1990

[30] Foreign Application Priority Data

Jun. 3, 1989 [JP] Japan .................................. 1-141880

[51] Int. Cl.⁵ ............................................. G06F 15/46
[52] U.S. Cl. .................... 364/471; 364/468; 156/353; 156/367
[58] Field of Search ............... 364/468, 469, 471, 131, 364/138, 140, 474.09; 156/350, 351, 353, 367, 64; 83/76.1, 73, 76

[56] References Cited

U.S. PATENT DOCUMENTS

| | | | |
|---|---|---|---|
| 4,015,493 | 4/1977 | Woolston | 364/474.09 |
| 4,174,237 | 11/1979 | Hemming, Jr. et al. | 364/471 |
| 4,576,663 | 3/1986 | Bory | 364/471 |
| 4,689,736 | 8/1987 | Glaudel et al. | 364/140 |
| 5,049,216 | 9/1991 | Shead et al. | 156/64 |

*Primary Examiner*—Jerry Smith
*Assistant Examiner*—Paul Gordon
*Attorney, Agent, or Firm*—Schwartz & Weinrieb

[57] ABSTRACT

Disclosed is a decentralized control method for a corrugator line characterized by the fact that, in the control method for a corrugator line for the continuous production of corrugated boards including the process of bonding a liner to the corrugated medium so as manufacture a single-faced corrugated board, bonding another liner to this single-faced corrugated board so as to fabricate double-faced corrugated boards or sheets, cutting the boards into predetermined lengths, and the like and having a local control unit provided for each process unit which is set up by dividing the aforenoted series of production processes so as to achieve synchronized production control of the line by means of these unit-process local control units which are allotted different functions and which are linked into a multiplex transmission network. The cycle pulses (that is, the synchronization signal which serves as the production reference for each control unit) that are obtained, when the double-faced or double wall corrugated boards are cut into the required lengths, are used and supplied to the main control unit and each local control unit for the synchronized production control by means of the local control units.

2 Claims, 2 Drawing Sheets

DECENTRALIZED CONTROL METHOD FOR CORRUGATOR LINE

FIELD OF THE INVENTION

This invention relates to a decentralized (distributed) control method for a corrugator line, and more particularly to a decentralized control method for a corrugator line which achieves the production of corrugated boards and the subsequent series of operations including sheet cutting, wherein a group of machines constituting the corrugator line are suitably divided into a plurality of units depending upon the production processes, with control units being disposed for controlling these units, respectively, so as to carry out various information interchange operations therebetween through means on a multiplex transmission network linking these decentralized control units, whereby not only instantaneous control but also a high-accuracy feed length within the production line and for a predetermined quantity can be achieved by feeding a synchronizing signal, corresponding to a cutting cycle signal which is used as a production reference within the corrugator line and a pulse train signal which is emitted every time a predetermined length of sheet is fed, which is indicative of the amount of feed production.

BACKGROUND OF THE INVENTION

In a corrugator in which a corrugating medium is allowed to have a predetermined corrugation, and wherein the medium is banded to a liner so as to form a single-faced corrugated board sheet, followed by additionally bonding the single-faced corrugated board with another liner to form a double-faced corrugated board sheet, there is additionally included a group of machines for performing a subsequent series of operations upon the double-faced corrugated board sheet or double wall corrugated board sheet, such as, for example, slitting, scoring and cutting the same into predetermined length. The series of machines including the corrugator and the various processing machines as a whole constitute a so-called "corrugator line", and in connection with current technology corrugator lines, more and more emphasis is placed upon the comprehensive control of the group of processing machines within the line so as to realize rationalized production control.

In an initial stage of a current technology computer-aided corrugated board production system, a central control system (CCS) has been employed, in which a main computer control unit is designed to perform data transmitting and receiving, in a parallel manner, to and from the group of various machines within the line, and the respective machines are synchronously controlled based on such data. Within such a central control system, however, a tremendous amount of wiring is required for transmitting various data and control signals in a parallel manner to the group of various machines within the line, so that an especially elongated line of equipment, such as, for example, a corrugator suffers problems in that the number of wirings is increased and the production cost is accordingly elevated.

In order to overcome such problems, there is a tendency to adopt a decentralized control system in accordance with current corrugator line technology wherein in addition to one main control unit, a local control unit is attached to each one of the plurality of divided units of the production process, and the main control unit and the local control units are linked together within a multiplex transmission network. In this system, the synchronized production control of the entire line is achieved by means of the main control unit, while control of the individual operations within each processing unit is achieved by means of the local control unit.

Such a system can generally be called "a decentralized control systems for the corrugated line", which system has primarily been adopted for the reasons given below.

① Users need multi-kind, small-production lots, and manufacturers have to accommodate frequent changes in the users' orders with respect to both product kind and quantity. Therefore the following control functions have become necessary under the circumstances wherein a plurality of different orders and lots are to be produced with a single corrugator line.

An operation or control function to prevent unexpected difficulties and unnecessary variations in the production speed.

An operation or control function to reduce the erroneous sheet length due to order/lot changes to zero or to a predetermined minimum possible length, and to make advance production corrections so as to eliminate any excess or shortage of the products in the end.

An operation or control function to synchronize the production speed between single facer and double facer machinery so as to prevent any of excessive or shortage of volume of sheets upon the bridge, and to expand the numerical data for controlling such operations.

② In response to the need for more operative functions, higher operational speed, and higher accuracy of the corrugator line, the control volume and high-speed response within each processing unit and the machines operatively associated therewith must be increased, and furthermore the following various information concerning other processing units, including the production command data, must be incorporated and correlated.

Information concerning the remaining sheet length at each machine so as to improve the accuracy of the sheet splice position.

Information concerning the variable lengths of the rolling capacity of each preheater for the cardboard webs to be fed, the stay-on-the-line volume, and the like.

Numerical information concerning the cardboard web stop/movement characteristics during splicing.

Information concerning each machine condition so as to determine the optimum production speed.

③ To reduce the number of defective products and thereby reduce costs and resources, each processing unit of such a current technology corrugator line has been rendered extremely high performance and the detected data has increased in volume following the progress in the product quality control by means of computers and the tracking control of deteriorated quality parts. This data must be commonly used by other processing units.

④ With the improvement of machine performance, the need to save labor at the work site has increased. Monitoring equipment and operation by means of knowledgable operators have become necessary in order to guarantee the safe and efficient operations, such functions and operations requiring the supply of more appropriate information and more diversification of the information contents.

For instance, a large-sized multi-purpose display board and further intelligent monitoring devices are needed.

⑤ Standardization, high maintainability and improvement in loss preventive ability of the production control system are required.

While the aforenoted decentralized control system is extremely useful and can satisfy the diverse users' and manufacturers' needs, it is confronted with new problems to be solved, which are related to the real time performance required when the decentralized unit-process control systems within the corrugator line are connected with a multiplex transmission network so as to realize the control functions by means of a computer program.

That is to say, the decentralized control system for a corrugator line is required to perform the functions of first transmitting the production plan instruction data, performing real-time communication between the control systems of processing units concerning the production conditions which change with the passage of time, and finally collecting the data for production results for the purpose of achieving the rationalized production control in connection with the production of corrugated board sheets. Thus, when these real-time communications are generated between the unit-process control systems, there is the problem of how to deal with the communication processing time which significantly affects the final performance of the system.

For example, the transmission of the production control information must satisfy the required performance of the control system and an ideal transmission function for the synchronism of the operations which can occur simultaneously in connection with the positional relationships defined between the plurality of unit-process control systems such that the same are suitable for this requirement to be realized. However, when the 2.5 Mbps performance is used within the present practical local area network (LAN) capable of N:N communications, its response is approximately 5 msec. (millisecond) at best, which value further increases by one figure when it is used within a large system with additional nodes (that is, the number of links within the multiplex transmission network). The "deviation error" of the position upon the production sheet due to the processing time, and when combined with other error factors, causes dissatisfaction of the specification requirements, so it was therefore desired to reduce the control errors as close to zero as possible. However, the computer system using an ideal highspeed local area network (LAN) producing no errors due to the processing time is extremely expensive at the present time.

If the production speed of a corrugator line is assumed to be, for instance, 360 m/min., the deviation error will be 30 mm or more (360 m/min. × 1/60 min/sec. × 0.005 sec. × 1000 mm/m = 30 mm) when considering the aforenoted response performance.

On the other hand, the production control information communications generated between the node controllers within a decentralized control system is not only monodirectional, but may be bi-directional. For instance, when the node A controller requests the node B controller to inform it of the remaining sheet length in order to carry out the same positional operation, the latter controller extracts the remaining sheet length information and transmits its data to the node A controller. By means of such information, the node A controller can determine the required position of the production sheet, but in view of the fact that such has been derived as a result of bi-directional information interchange, twice the errors will occur per communication of each factor.

In addition, when these operational results are communicated to the node C controller so as to further adjust the process C to the same position, further errors will, needless to say, be added thereto. In other words, within the line control system wherein this repetition processing comprises additional steps, the deviation error increases as the steps increase in number. Thus this error varies so much according to the system size and control volume that it cannot be quantified (this is the reason why it is simply called "the deviation error").

SUMMARY OF THE INVENTION

This invention is proposed so as to solve the above-mentioned problems involved in the decentralized control system of a corrugator line for controlling the divided production processes by linking their local control units to a multiplex transmission network, and its object is to provide a decentralized control system which can remove the influence of the processing time required for the computer control processing and transmission within each unit-process control system by performing such transmission instantaneously and which can provide the feed length during production at a constant quantity.

In order to overcome the above-mentioned problems and achieve the intended object, this invention is characterized by the fact that, in connection with the control process for operating a corrugator line for the continuous operation of making corrugated boards including the process of bonding a liner to the corrugated medium so as to manufacture a single-faced corrugated board, bonding another liner to this single-faced corrugated board so as to manufacture a double-faced or double wall corrugated board, cutting the board into a plurality of boards each having a predetermined length, and the like, and having a local control unit provided for each individual process which were developed by dividing the aforenoted series of production processes, whereby a synchronized production control of the line by means of these unit-process local control systems which are allotted different functions is able to be achieved by having such local control systems linked into a multiplex transmission network, wherein the cycle pulses (that is, the synchronization signal which serves as the production reference for each control unit) obtained when the double-faced or double wall corrugated boards are cut into the predetermined lengths, are used and supplied to the main and each local control unit for achieving the synchronized production control by means of the local control units.

In addition, the system is characterized by the fact that a feed length measuring mechanism is provided at appropriate positions so as to obtain the feed length pulses according to the processing of the double-faced or double wall corrugated boards, and the feed length pulse serving as the standard for the sheet feed length is supplied to the main control unit and at least one of the local control units for achieving the synchronized production control with a high degree of accuracy.

As a result of the foregoing, the following operational advantages in connection with the operation and control of a corrugator line are achieved by means of the present invention:

(1) Influences of the processing time including that of transmission within the decentralized control system, that is errors in the feed length, can be reduced to almost zero.
(2) The control function program including the transmission among decentralized local control units can be planned without the need for considering the processing time.
(3) Since the production feed length positions determined so as to have an absolute value based upon the feed length reference and production reference data, the control program can be commonly used by means of all control units.
(4) If the real-time actual control file is prepared by including the production reference values in the key codes of the production data based upon which the production history is written and the operational results are aggregated, both the file and the processing program can be simplified.

BRIEF DESCRIPTION OF THE DRAWINGS

Various other objects, features, and attendant advantages of the present invention will become more fully appreciated from the following detailed description, when considered in connection with the accompanying drawings, in which like reference characters designate like or corresponding parts throughout the several views, and wherein.

PREFERRED EMBODIMENT OF THE INVENTION

Figure 1:
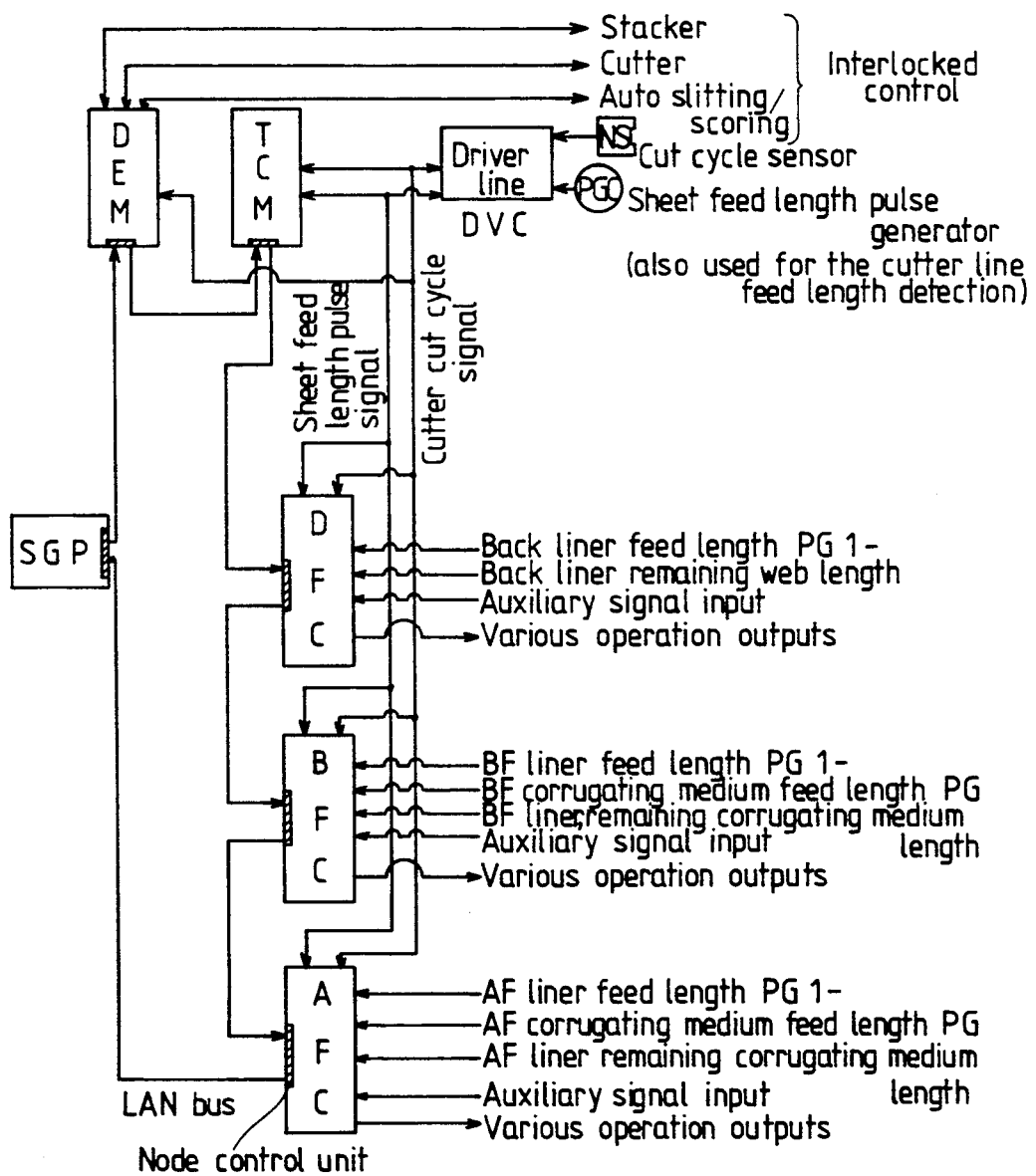
FIG. 1 is a schematic diagram illustrating basic constitution of a decentralized control system in which a preferred embodiment of the control system of the present invention is practiced.

Referring now to the drawings, the decentralized control method for operating a corrugator line according to this invention will now be explained with reference to some suitable embodiments thereof. First, the background upon which this invention has been based and developed will be discussed. Various kinds of data are transmitted, received, utilized, and otherwise processed in connection with the production control of a corrugator line, such as, for example:

(1) Production instructions and operational results data.
(2) Feed length data relating to each factor at each part.
(3) Data for the control conditions of each machine and production conditions, and the like.
(4) Data for detection conditions by means of each sensor.
(5) Data for the operation by operators and the man/machine communications to be used for display.
(6) Data for the necessary parameters for control.

In consideration of the functions and performance of a corrugator line, the aforenoted different types of data produced in carrying out the production control must be classified in connection with the functions of synchronism and constant quantity, and control means must be allotted in a rationalized way for enhancing the control efficiency. Here the items of "synchronism" are ranked (A) high-speed cyclic transfer, (B) intermediate-speed cyclic transfer and (C) transient transfer (low speed) according to the purpose of the data used. Furthermore, "the constant quantity" has been conventionally identified with the classifying codes, but in accordance with this invention, it is proposed to add, besides these codes, ①  the production reference data incorporating the cut cycle pulse (that is, the synchronization signal for each unit-process controller) produced when the double-faced or double wall corrugated board is cut into the predetermined lengths and furthermore, it is proposed to add ② the feed length reference data using the feed length pulses in the form of the sheet length standard output from the feed length measuring systems arranged at desired positions along the processing path of the double-faced or double wall corrugated boards, in response to their processing conditions.

Since "the production reference" is directly related to the cut length and the number of produced sheets in accordance with the production instruction data, its correlation can be defined by means of a relatively simple logic within a decentralized control system. The cut cycle signals which are related to the rotation of the cutter cylinder when it rotates so as to cut the sheets are generated by means of an appropriate method (in this embodiment, the cut cycle sensor is set at an appropriate position upon the circumference of the cutter cylinder, but the signals may be generated from a cutter control unit), are inputted into each decentralized control system, and are used as the cut free counter values displaying the number of cuts upon the signal counter provided within the system.

Incidentally, since the values from each decentralized controller become the key reference data for the production conditions, communication is made to confirm that the values from each decentralized control system are always in accord with those from the other control systems, and if they are not, correction is made so as to render the same in accordance with each other. Furthermore, "the feed length reference" should be the feed length pulse signals which are the measured production feed length of the double-faced or double wall corrugated boards considering the conditions that the production sheet web continues up to the cutter. New signals may be set up for this system, but in accordance with this embodiment, the output signals from the line feed length pulse generator for the cutter are used as explained later. This feed length pulse signal is also input when the decentralized control system needs it and a free counter is provided within the system for counting this signal, which is used as the feed length data to represent the sheet feed length. This data is utilized for preparing the feed length reference data which is the value of the distance from the point indicated by means of the production reference data when the product position must be determined with a high degree of accuracy during communication concerning an event.

Figure 2:
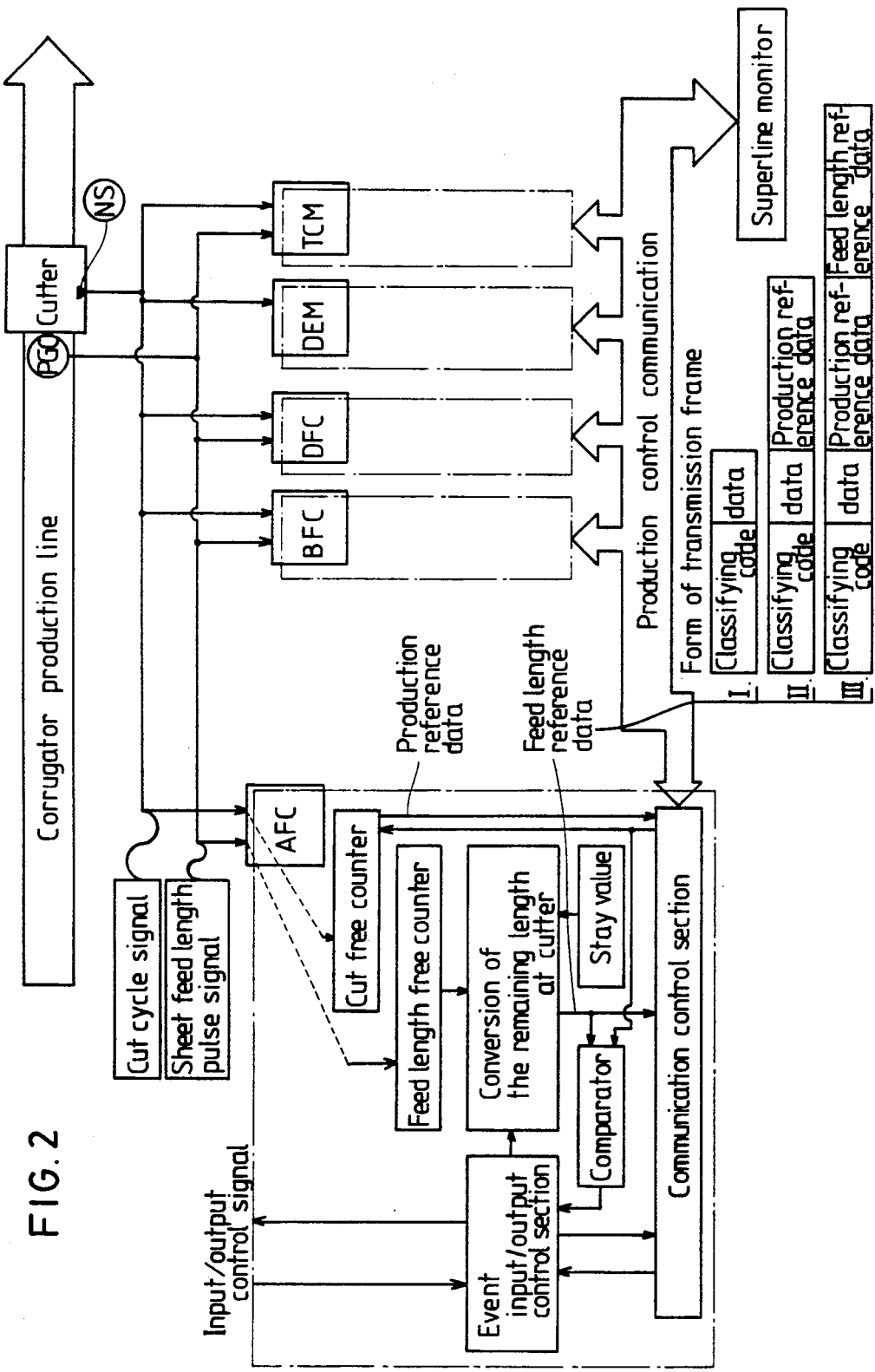
FIG. 2 is a schematic diagram illustrating the operational interrelationships defined between the corrugator line and the decentralized control system constructed in accordance with this invention.

With reference now being made specifically to the drawings, FIG. 1 illustrates basic constitution of a decentralized control system suitable to practice the present invention, and FIG. 2 illustrates the communication interrelationships defined between the corrugator line and the decentralized control system so as to practice the decentralized control system according to the present invention. The symbols shown in FIG. 1 correspond to the devices with the following functions:

TCM: Main control unit (commands the control of the entire corrugator line).

DFC: DF controller (local control unit attached to the double facer for its control when it produces double-faced or double wall corrugated boards).

BFC: BF controller (local control unit provided for the control of B-flute single-faced corrugated board).

AFC: AF controller (local controller provided for the control of A-flute single-faced corrugated board).

DEM: Drive end controller (controller for the interlocked control of the downstream slitter, scorer, stacker, and the like.

SGP: Graphic panel (display panel for graphically indicating the production control conditions within the entire corrugator line).

DVC: Signal line driver.

A multiplex transmission network, to be represented typically by means of the designation LAN (local area network), connects the aforenoted main control unit TCM, a plurality of local control units DFC, BFC, AFC, DEM and SGP attached to each process unit of the corrugator line and all other control devices. It is to be noted that the signals from each decentralized control unit, as shown by means of the arrow marks in the figure, include the operational output signals to each machine under control, the detection input signals, and the like, which directly control the machines. On the other hand, the output signals from the cut cycle sensor Ns and the sheet feed length pulse generator PGC are input into the signal line driver DVC, where they are amplified and the output therefrom in the form of the cutter cut cycle signals or sheet feed length pulse signals is input into each decentralized controller, if necessary. This is the basic constitution of the system of the present invention.

According to the present invention, in order to reduce the errors generated within the production line, with the passage of time and due to the delay within the processing time by means of the microcomputer including the time of communication, as much as possible, the cutter cut cycle signals (cut pulse may be used) are derived from the cut cycle sensor Ns, provided at the rotary cutter, each time the sheet is cut, as shown, in FIG. 2, and supplied (as the synchronization signal which is the common production reference for each process unit) to not only the main control unit but to all other ones of the plurality of local control units DFC, BFC, AFC, DEM, and the like. This cut cycle signal is used for approximate synchronization of the production control by means of each control unit. Namely, the values are distributed among the local controllers by providing each one of the controllers with a cut free counter which count simultaneously, or by providing suitable communication therebetween when the power is switched on or within an appropriate cycle so as to preset the values. Accordingly, when transmission becomes necessary (that is, when an event occurs) due to changes in the production conditions, the value shown upon the cutter free counter is used as the production reference data at the cutter position.

Furthermore, a sheet feed length pulse generator PGc is provided upstream as the rotary cutter for measuring the sheet feed length and the sheet feed length pulse signal from the generator PGc is supplied, if necessary, to the main control unit TCM and the plurality of local control units DFC, BFC, AFC, and the like, as the signal source so as to prepare the sheet feed length reference data. It is noted that, the sheet feed length pulse generator PGc for the cutter need not always be used for this purpose, but an additional generator may be set up at a different position upon the double-faced or double wall corrugated board so as to detect the sheet feed length pulse signals. This feed length pulse is used for exactly synchronized production control by means of the local control units. Namely, a feed length free counter is provided at each control unit for performing a continuous counting operation, and if transmission becomes necessary (that is, when an event occurs) due to any changes in the production conditions, the value shown by means of this feed length free counter is used as the feed length data at the cutter part. This value is saved along with each cut cycle signal, and this value and the line stay length value are used so as to generate the feed length reference data which is the difference value with respect to the production reference data through means of calculations so as to determine the proper position.

Since the common data for production and feed length standards have been provided for decentralized control systems, even if the processing time of a local controller or the necessary processing time for communications is considered, or even if there are time deviations, such factors do not result in errors in the feed length value. Namely, when such an abnormal event such as, for example, the detection of a paper joint, a paper joining or lot change operation, the detection of one face defects, or the generation of a signal from a single facer stop defect indicator, or the life, occurs, these events must be accurately interlocked with the downstream processing units, and they are in communication with the downstream processing units by means of with the event classifying code.

As an example, calculation a processing method to determine the position upon the sheet with respect to a certain factor, such as the feed length reference data will be described. A factor usually occurs between the production reference data Ca cut and Ca+1 cut. Let's note the feed length free count value in the case of the Ca cut to be F(a), the feed length free count value when the factor occurs to be F, the value of the straight line distance from the cutter when the factor occurs to be P, and the line stay variables to be A, then the feed length reference data Fa will be $Fa = F - F(a) + P + A$ enabling it to generate the feed length reference data for the value occurring at the previous cut Ca time. In other words, this production reference value allots a common number to the cutting operation by means of the cutter within each control unit and the feed length reference value represents the value of the distance from the cutter position with respect to a specific production reference value, thus making the position upon the production sheet an absolute value.

On the other hand, when the transmission frame inlcuding the production reference value Ca and the feed length reference value Fa is received, the value of the distance of the factor to be recognized Gb is $Gb = Fa - (G - Ga)$ based upon the previous feed length free count value G, the stored previous feed length free count value Ga in connection with the production reference value Ca, the received feed length reference value Fa, and the like, with the required time for the factor transfer included within the processing time including that of transmission. Therefore, the position of this factor on the production sheet can be accurately recognized or determined no matter how many times the transmission may be made or how much delay there may occur within the processing time.

The description made so far concerns a factor whose position should be manually determined with accuracy under such circumstances, the type III transmission frame is used as the transmission frame and such frame is shown in FIG. 2, however some other factors do not need such accuracy. For instance, when the position of a defective part and the number of discharged sheets are transmitted to the DEM control unit from any other controller, it suffices to add the position of the defective part in the form of the conventional production reference Cf, whereby, in such case the type II transmission frame is used as the transmission frame. The type I communication frame is for general use.

Obviously, many modifications and variations of the present invention are possible in light of the above teachings. It is therefore to be understood that within the scope of the appended claims, the present invention may be practiced otherwise than as specifically described herein.

What is claimed is:

1. A decentralized control method for controlling the operation of a corrugator line which is employed for continuously making corrugated boards, comprising the steps of:

bonding a liner to a corrugated medium so as to form a single-faced corrugated board;

bonding another liner to said single-faced corrugated board so as to form a double-faced corrugated board;

cutting said double-faced corrugated board into individual double-faced corrugated board sheets having a predetermined length;

providing a local control unit for each unit process embodied within each one of the preceding process steps for performing synchronized production control of said corrugator line by means of said unit-process local control units which are allotted different operational functions and which are linked together within a multiplex transmission network;

providing a main control unit for controlling the entire operation of said corrugator line; and supplying cycle pulses, comprising synchronization signals which serve as a production reference for each one of said local control units and which are obtained when said double-faced corrugated boards are cut to said predetermined lengths, to said main control unit and each one of said local control units for achieving said synchronized production control of said corrugator line by means of said local control units.

2. A decentralized control method for controlling the operation of a corrugator line which is employed for continuously making corrugated boards, comprising the steps of:

bonding a liner to a corrugated medium so as to form a single-faced corrugated board;

bonding another liner to said single-faced corrugated board so as to form a double-faced corrugated board;

cutting said double-faced corrugated board into individual double-faced corrugated board sheets having a predetermined length;

providing a local control unit for each unit process embodied within each one of the preceding process steps for performing synchronized production control of said corrugator line by means of said unit-process local control units which are allotted different operational functions and which are linked together within a multiplex transmission network;

supplying cycle pulses, comprising synchronization signals which serve as a production reference for each one of said local control units and which are obtained when said double-faced corrugated boards are cut to said predetermined lengths, to each one of said local control units for achieving said synchronized production control of said corrugator line by means of said local control units; and supplying feed length pulses, which serve as sheet feed length reference values and which are obtained from feed length measuring means disposed along a transportation route of said corrugated boards as said corrugated boards are transported along said transportation route, to each one of said local control units for achieving highly accurate synchronized production control of said corrugator line by means of said local control units.

* * * * *